United States Patent [19]

Douglas

[11] 4,181,312
[45] Jan. 1, 1980

[54] SLINGER DEVICE

[76] Inventor: Fredrick Douglas, 10801 W. 54th St., Shawnee, Kans. 66203

[21] Appl. No.: 904,864

[22] Filed: May 11, 1978

[51] Int. Cl.² ............................................. F16J 15/54
[52] U.S. Cl. ..................................... 277/133; 277/189
[58] Field of Search ........................ 277/189, 133, 134

[56] References Cited

U.S. PATENT DOCUMENTS

| | | | |
|---|---|---|---|
| 2,292,920 | 8/1942 | Barrows | 277/133 |
| 2,505,391 | 4/1950 | Fletcher | 277/133 |
| 2,646,999 | 7/1953 | Barske | 277/133 |

Primary Examiner—Robert I. Smith
Attorney, Agent, or Firm—Lowe, Kokjer, Kircher, Wharton & Bowman

[57] ABSTRACT

A slinger device installed between a pump housing and bearing housing to deflect liquid leaking from the pump housing away from the bearings. The slinger is in the form of an annular disc mounted on the shaft of the pump impeller and sealed thereto by a pair of o-rings. Triangular vanes on the disc propel leaking liquid outwardly by centrifugal action. A ridge is formed between each pair of vanes to direct liquid toward the sides of the vanes along flat surfaces of the disc extending between the ridge and vane.

7 Claims, 4 Drawing Figures

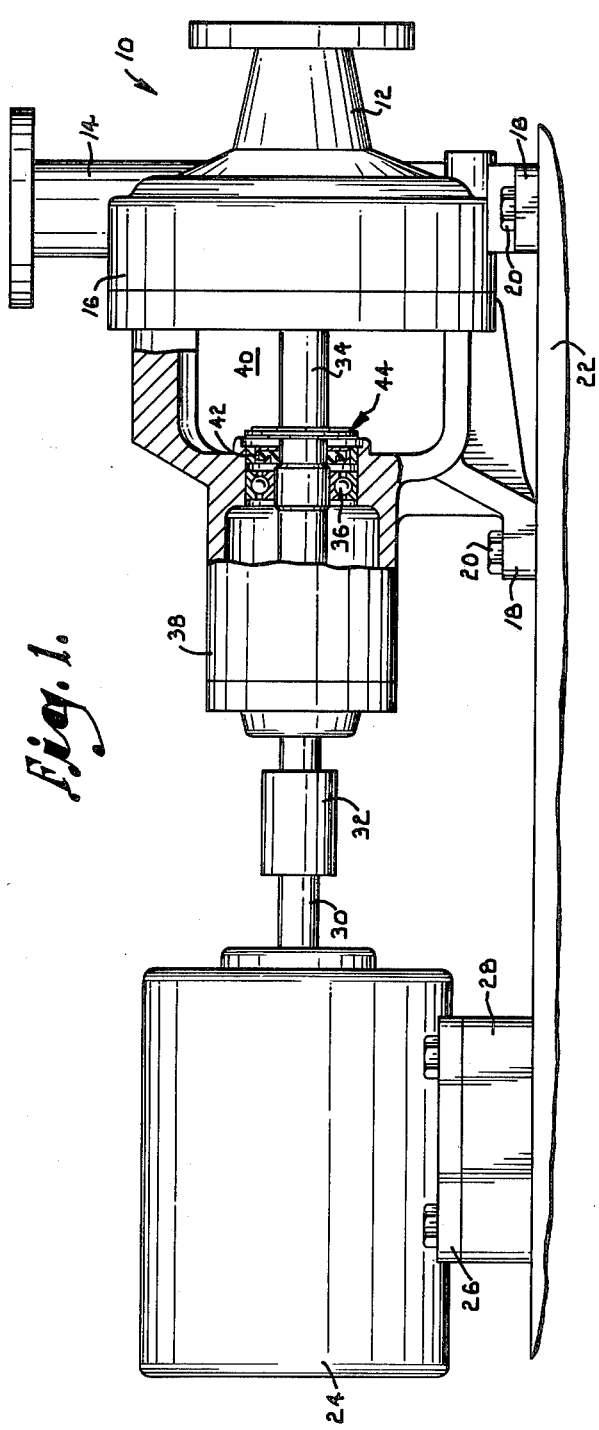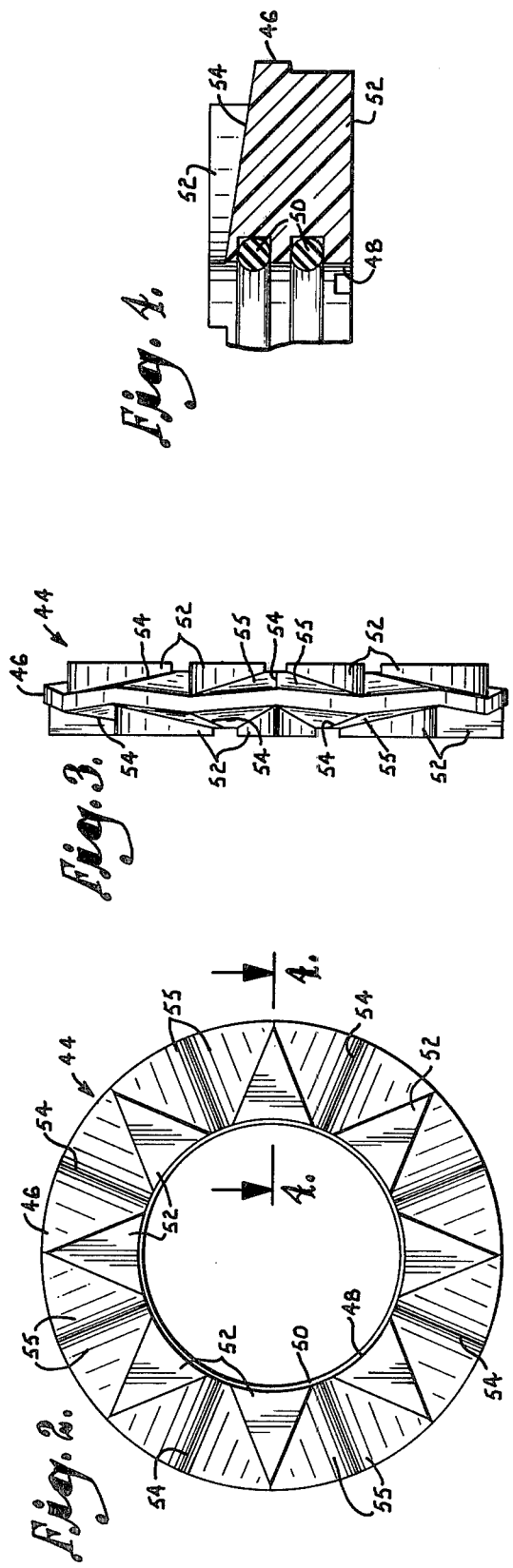

SLINGER DEVICE

BACKGROUND AND SUMMARY OF THE INVENTION

This invention relates to an improved slinger device that acts to prevent contamination of the bearings of a pump assembly caused by a leakage of liquid from the pump housing.

Even though pump housings are sealed against leakage of the liquid that is being pumped, the seal invariably fails or develops leaks after being subjected to the wear that accompanies prolonged use. When the seal begins to leak, liquid leaking out of the pump housing enters the area of the bearings which support the pump shaft. If the liquid leaks into the bearing housing, it can contaminate the bearings and their lubricant, thereby significantly decreasing the useful life of the bearings and the overall pump unit.

In order to compensate for this problem, it is common for devices known as "slingers" to be mounted on the pump shaft between the pump housing and bearing housing. The slinger provides a deflector plate which deflects the leaking liquid away from the bearing area. Typically, existing slingers are simple annular washers which tend to develop their own leaks and in any event are less than fully effective in preventing liquid from reaching the bearings. This type of slinger device is mounted on the shaft in a manner that allows an unacceptable amount of liquid to leak between the slinger and shaft, particularly after extensive use.

The more complicated deflector devices have likewise been ineffective in preventing leakage into the bearing housing and have the further drawback of being unduly complex and expensive. Such devices typically include curving vanes or vanes of another complex shape which makes them difficult and costly to fabricate. Due to the curvature of their vanes, deflector devices of this type are capable of operating only with the shaft turning in one direction. In addition, since the vanes are located on only one side of the device, it must be carefully installed to insure that the vanes face in the proper direction toward the oncoming liquid leaking out of the pump housing. Furthermore, devices of this nature do not mount firmly enough on the shaft to assure that they will rotate properly, nor do they seal against the shaft effectively enough to preclude leakage along the shaft.

It is the primary object of the present invention to provide an improved slinger device which prevents leakage of liquid into the bearing housing of a pump assembly.

Another object of the invention is to provide a slinger device of the character described which is constructed to propel leaking liquid outwardly in a more effective manner than is accomplished with the devices that have been proposed in the past. In this respect, the tapered shape of the vanes and the ridges located between adjacent vanes are important in that they assist in directing the liquid outwardly with increased effectiveness.

Yet another object of the invention is to provide a slinger device of the character described which mounts on the pump shaft firmly enough to assure that it rotates directly with the shaft and effectively seals against the shaft.

A further object of the invention is to provide a slinger device of the character described having symmetrical vanes which deflect the leaking liquid equally well with the pump shaft rotating in either direction.

An additional object of the invention is to provide a slinger device of the character described wherein vanes are formed on both sides so that the device may be positioned on the shaft with either side facing the leaking liquid, thereby simplifying installation of the device.

A still further object of the invention is to provide a slinger device of the character described which is simple and economical to construct and which may be used with various types and sizes of pump units.

Other and further objects of the invention, together with the features of novelty appurtenant thereto, will appear in the course of the following description.

DETAILED DESCRIPTION OF THE INVENTION

In the accompany drawing which forms a part of the specification and is to be read in conjunction therewith and in which like reference numerals are used to indicate like parts in the various views:

FIG. 1 is a side elevational view of a conventional pump that is equipped with a slinger device constructed according to the present invention, with portions broken away for illustrative purposes;

FIG. 2 is an enlarged front elevational view of the slinger device of the present invention;

FIG. 3 is a side elevational view of the slinger device shown in FIG. 2; and

FIG. 4 is a fragmentary sectional view on an enlarged scale taken generally along line 4—4 of FIG. 2 in the direction of the arrows.

Referring initially to FIG. 1, numeral 10 generally designates a conventional pump having an inlet 12 for receiving the liquid that is to be pumped. The liquid is pumped from inlet 12 to an outlet 14 by an impeller (not shown) located within the enclosed pump housing 16. The pump housing has lugs 18 which are bolted at 20 to a mounting plate 22 on which the pump is supported.

The impeller (not shown) is driven in the usual manner by a conventional electric motor 24 having mounting feet 26 which are bolted to blocks 28 secured to plate 22. The motor 24 drives an output shaft 30 which is coupled at 32 with a drive shaft 34 on which the impeller is carried. Shaft 34 is rotatably supported by a ball bearing 36 mounted within one end of a bearing housing 38 and by a similar bearing (not shown) located at the opposite end of the bearing housing.

Shaft 34 is sealed to the end plate of the pump housing 16 to prevent leakage of the liquid that is being pumped between inlet 12 and outlet 14. However, since the seal (not shown) can fail or develop leaks, an open area 40 is presented between the pump housing 16 and the bearing housing 38 so that the leaking liquid can be discharged from the unit before it reaches the bearings. A seal element 42 is provided at the end of the bearing housing to prevent any leaking liquid from reaching bearing 36, although the seal 42 can also develop leaks.

In accordance with the present invention, a slinger device 44 is mounted on shaft 34 to deflect leaking liquid away from the bearing housing 38. Referring now particularly to FIGS. 2-4, the slinger 44 is in the form of an annular disc 46 provided with a central circular opening 48. The disc 46 may be made of any suitable material such as nylon or the like. The surface of disc 46 surrounding opening 48 is recessed to receive a pair of identical o-rings 50 which are formed of rubber or another similar material capable of effecting a liquid tight seal with shaft 34. As shown in FIG. 4, each o-ring 50 projects inwardly within opening 48 such that when the disc is installed on shaft 34, the o-rings provide a tight seal and also serve to firmly mount the disc on the pump shaft for rotation directly therewith.

Disc 46 has opposite side surfaces which are each provided with a plurality of triangular vanes 52 molded integrally on the disc. Vanes 52 extend in a generally radial direction along each surface of disc 46 and taper to a point as they extend outwardly from the edge of opening 48 to near the periphery of the disc.

On each of the opposite surfaces of disc 46, a plurality of straight ridges 54 extend radially on the disc, with one ridge located between each pair of vanes 52. Substantially flat surfaces 55 located on either side of each ridge 54 extend from the ridge to the adjacent vane 52. These surfaces 55 serve to direct liquid toward the side surfaces extending along the opposite sides of each vane 52. As shown in FIG. 3, each side surface of each vane gradually increases an area as it extends outwardly. The thickness of disc 46 decreases correspondingly from the center to the outer edge.

In use, the slinger 44 is installed on shaft 34 with the shaft extending closely through opening 48. The o-rings 50 tightly seal against the shaft and firmly mount the slinger for rotation directly with the shaft. The slinger is located near the seal element 42 of the bearing housing 38 at a location within the open area 40 between the bearing housing and the pump housing 16.

When the pump housing develops a leak permitting the liquid being pumped to leak out of the pump housing into area 40, the liquid encounters slinger 44 prior to reaching the bearing housing. Since the slinger is turning with shaft 34, the liquid is subjected to centrifugal force which propels it radially outwardly and out of the pump unit through the open area 40. The liquid which strikes the surface of the disc 46 is directed toward the sides of vanes 52 and then outwardly along the vanes by centrifugal action. The incline of surfaces 55 from ridges 54 toward vanes 52 assists in directing the liquid toward the vanes, thereby increasing the amount of liquid which is caused to impact against the vanes and be propelled outwardly in the intended manner. The increase in the surface area on the outer portions of the sides of the vanes likewise assists in achieving the desired result because a greater quantity of liquid can be handled by the large outer vane portions.

In this fashion, the slinger 44 prevents bearing 36 and the remainder of the bearing housing 38 from being contaminated by leaking liquid. The outwardly tapered shape of vanes 52 enhances the effectiveness of the device in deflecting liquid. Since the sides of the vanes are inclined with respect to a radius of the disc, they are able to propel the liquid outwardly more effectively than vanes that extend in a more nearly radial direction on the disc. Further, the effect of ridges 54 and the flat adjoining surfaces 55 along which the liquid is directed toward the vanes, in cooperation with the triangular configuration of the vanes, results in a much greater proportion of the liquid being deflected away from the bearing housing than occurs with existing slingers. Accordingly, the bearings are fully protected against contamination.

It is thus apparent that the effectiveness of the slinger is improved due to the manner in which it is constructed, and that it mounts on shaft 34 firmly and in a manner to provide an effective seal due to the provision of the two spaced apart o-rings 50. Moreover, the device can be simple and economically molded in a single piece (except for the o-rings), and it can be installed on shaft 34 with either surface facing toward the pump housing 16. By virtue of the symmetrical shape of vanes 52, shaft 34 can turn in either direction without reducing the effectiveness of the slinger in deflecting liquid away from the bearing housing.

The location of slinger 44 close to the end of bearing housing 38 prevents liquid from passing around the edge of the slinger and behind it into the bearing housing. This feature is particularly important when chemicals are being pumped because when such chemicals leak out of the pump housing, it is common to dilute them with large quantities of water until the pump can be shut down. The large volume of water that is introduced into area 40 of the pump unit would exhibit a strong tendency to leak into the bearing housing were it not opposed by the closely fitting slinger and the deflection it provides. As an added benefit, the vanes 52 provide fan type action which circulates the air within area 40 and thereby cools the bearing housing and bearings.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A device for moving a liquid away from a bearing which supports a shaft, said device comprising:
   a disc member presenting an opening therein adapted to receive the shaft in a manner to mount said disc member on the shaft for rotation therewith,
   said disc member being characterized on at least one side by alternating inclined surfaces, two of said surfaces being disposed in back to back relationship to present a ridge,
   a plurality of raised angular vane members disposed in spaced apart relationship between each pair of inclined surfaces,
   each of said vane members presenting opposed side surfaces which are contiguous with and project upwardly from an adjacent inclined surface, said side surfaces extending from said opening and merging toward each other as they approach the periphery of said disc member,
   whereby liquid contacting said disc member is impelled outwardly along said side surfaces and said inclined surfaces.

2. A device as set forth in claim 1, wherein each of said side surfaces is substantially flat and increases in an area toward the periphery of said disc member.

3. A device as set forth in claim 1, wherein each of said vanes presents a flat surface extending between said opposed side surfaces.

4. A device as set forth in claim 1, wherein said disc member presents opposite side surfaces each of which is characterized by said inclined surfaces, said vane members being disposed on both of said opposite side surfaces.

5. A device as set forth in claim 4, including a ring element mounted to said disc member in extension around said opening, said ring element being adapted to effect a liquid tight seal against said shaft and to mount said disc member on said shaft for rotation therewith.

6. A device as set forth in claim 4, including a pair of ring elements mounted to said disc member in extension around said opening at spaced apart location, said ring elements being adapted to effect a liquid tight seal against said shaft and to mount said disc member on said shaft for rotation therewith.

7. A device as set forth in claim 1, wherein said inclined surfaces and said vane members extend from said opening to the periphery of said disc member.

* * * * *